(12) United States Patent
Zhang et al.

(10) Patent No.: US 11,241,861 B2
(45) Date of Patent: Feb. 8, 2022

(54) SYSTEM FOR PRODUCING CHOPPED ROVING THERMOPLASTIC COMPOSITE SHEETS

(71) Applicant: JOHNS MANVILLE, Denver, CO (US)

(72) Inventors: Mingfu Zhang, Englewood, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 100 days.

(21) Appl. No.: 16/460,603

(22) Filed: Jul. 2, 2019

(65) Prior Publication Data

US 2021/0001599 A1  Jan. 7, 2021

(51) Int. Cl.
| | |
|---|---|
| *B32B 5/28* | (2006.01) |
| *B32B 27/12* | (2006.01) |
| *B29C 70/50* | (2006.01) |
| *B29C 70/12* | (2006.01) |

(52) U.S. Cl.
CPC .............. *B32B 5/28* (2013.01); *B29C 70/12* (2013.01); *B29C 70/506* (2013.01); *B29C 70/508* (2013.01); *B32B 27/12* (2013.01); *B32B 2260/021* (2013.01); *B32B 2260/046* (2013.01); *B32B 2262/101* (2013.01)

(58) Field of Classification Search
CPC ..... B32B 5/28; B32B 27/12; B32B 2260/021; B32B 2260/046; B32B 2262/101; B29C 70/506; B29C 70/12; B29C 70/508; C08J 2300/22; C08J 5/04
See application file for complete search history.

(56) References Cited

U.S. PATENT DOCUMENTS

| | | | | |
|---|---|---|---|---|
| 4,743,187 | A | * | 5/1988 | Schermutzki ........... B29B 15/12 100/152 |
| 5,145,626 | A | * | 9/1992 | Bastioli ................... B29C 43/48 264/112 |
| 5,415,738 | A | | 5/1995 | Mehta et al. |
| 5,741,744 | A | | 4/1998 | Fitchmun |
| 7,438,839 | B2 | | 10/2008 | Simpson et al. |
| 8,580,169 | B2 | | 11/2013 | Bell et al. |
| 2009/0309260 | A1 | | 12/2009 | Keuchel |
| 2013/0295806 | A1 | * | 11/2013 | Imai ........................... C08J 5/24 442/59 |
| 2014/0093736 | A1 | * | 4/2014 | Takada .................... B32B 15/20 428/416 |
| 2015/0031257 | A1 | | 1/2015 | Ootsubo et al. |
| 2016/0271860 | A1 | | 9/2016 | Mashima et al. |
| 2017/0066888 | A1 | * | 3/2017 | Zhang ........................ C08J 5/06 |

(Continued)

*Primary Examiner* — Jacob T Minskey
*Assistant Examiner* — S. Behrooz Ghorishi
(74) *Attorney, Agent, or Firm* — Robert D. Touslee

(57) ABSTRACT

A chopped roving thermoplastic composite sheet includes a web or mesh of chopped rovings and a thermoplastic resin that fully saturates the web or mesh of chopped rovings. The web or mesh of chopped rovings is not mechanically bonded and does not include a binder that bonds or adheres the chopped rovings together other than thermoplastic resin. As such, the thermoplastic resin and the web or mesh of chopped rovings are able to flow and conform to a mold or cavity when the chopped roving thermoplastic composite sheet is pressed within the mold or cavity and when the chopped roving thermoplastic composite sheet is heated to above the melting temperature of the thermoplastic resin.

23 Claims, 4 Drawing Sheets

(56) References Cited

U.S. PATENT DOCUMENTS

2017/0361546 A1 12/2017 Zhang et al.
2018/0162107 A1 6/2018 Ku et al.
2018/0229399 A1 8/2018 Zhang et al.

* cited by examiner

SYSTEM FOR PRODUCING CHOPPED ROVING THERMOPLASTIC COMPOSITE SHEETS

BACKGROUND

Thermoplastic composite sheets are gaining interest in the composite industry due to their superior properties such as impact resistance, thermoformability, and recyclability, as compared to thermoset sheets. One type of conventional thermoplastic composite sheets is organosheets based on fabrics, which are formed by weaving fiber bundles or rovings together. Because of the directionality of fiber orientation in fabrics, conventional thermoplastic organosheets show direction-dependent anisotropic mechanical properties, which poses significant challenges in designing composite parts to replace incumbent isotropic materials such as steel and aluminum. In addition, fabric-based thermoplastic composite sheets have limited conformability, which greatly increases the difficulty of forming composite parts with deep draws and complex geometries.

Another type of thermoplastic composite sheets is known as a glass mat thermoplastics (GMT). GMT is based on a glass mat that has randomly oriented fibers. To produce GMT, a glass mat, such as a needled mat, is formed first, followed by application of a thermoplastic resin onto a surface or surfaces of the glass mat. High pressure and long impregnation time are required to impregnate the glass mat with molten thermoplastic resin, due to the long flow length for the molten resin to travel from surface to interior of the mat.

The conventional thermoplastic composite sheets are produced in a two-step process. In the first step, a fiber substrate, such as fabric or mat, is produced. Fibers in the fabric or mat are either mechanically or chemically bonded. In the second step, a thermoplastic resin is applied to the fiber substrate, followed by resin impregnation. The two-step process adds cost and processing time to the production of conventional thermoplastic composite sheets.

BRIEF SUMMARY

The embodiments described herein provide chopped roving thermoplastic composite sheets, and specifically systems and methods for making the same. According to one aspect, a system for manufacturing a chopped roving thermoplastic composite sheet is described herein. The system includes a double belt mechanism that includes an upper belt and a lower belt. The upper belt is positioned atop the lower belt to compress a chopped roving web or mesh that is passed through the double belt mechanism and the lower belt has a longitudinal length that is substantially longer than the upper belt. A fiber applicator is positioned above the lower belt. The fiber applicator is configured to disperse chopped rovings atop the lower belt as the lower belt is moved under and past the fiber applicator. The chopped rovings are dispersed atop the lower belt to form the chopped roving web or mesh. A resin applicator is also positioned atop the lower belt. The resin applicator is configured to apply a thermoplastic resin to the chopped roving web or mesh.

The system also includes an oven that is configured to melt the thermoplastic resin as the chopped roving web or mesh and the thermoplastic resin are moved through the oven. The system is designed so that the double belt mechanism compresses the chopped roving web or mesh and the melted thermoplastic resin as the chopped roving web or mesh is passed through the oven. This facilitates in dispersing the melted thermoplastic resin within the chopped roving web or mesh and in saturating the chopped roving web or mesh with the thermoplastic resin. The system does not include an entangling device that entangles the chopped rovings of the chopped roving web or mesh nor does the system include a binder application device that applies a binder to the chopped rovings. As such, the chopped roving web or mesh is not mechanically bonded and does not include a binder other than the thermoplastic resin. The chopped roving thermoplastic composite sheet is also substantially free of unpolymerized resin materials.

According to another aspect, a method of forming a chopped roving thermoplastic composite sheet is described herein. The method includes dispersing, via a fiber applicator, chopped rovings atop a lower belt of a double belt press mechanism to form a chopped roving web or mesh atop the lower belt. The method also includes applying a thermoplastic resin to the chopped roving web or mesh and passing the chopped roving web or mesh through an oven that is configured to melt the thermoplastic resin as the chopped roving web or mesh is moved through the oven. The chopped roving web or mesh and the melted thermoplastic resin is also passed between the lower belt and an upper belt of the double belt press mechanism to press the melted thermoplastic resin and the chopped rovings and thereby disperse the melted thermoplastic resin through the chopped roving web or mesh and fully saturate the chopped roving web or mesh with the melted thermoplastic resin.

The method does not include entangling the chopped rovings via a fiber entangling device nor does the method include applying a binder to the chopped rovings. As such, the chopped roving web or mesh is not mechanically bonded and does not include a binder other than the thermoplastic resin. The chopped roving thermoplastic composite is also substantially free of unpolymerized resin materials.

According to another aspect, a chopped roving thermoplastic composite sheet is described herein. The chopped roving thermoplastic composite sheet includes a web or mesh of chopped rovings and a thermoplastic resin that fully saturates the web or mesh of chopped rovings. The chopped rovings have a roving length of between ¼ and 5 inches and a fiber diameter of between 1 and 30 µm. The thermoplastic resin is a fully polymerized thermoplastic material and as such, the chopped roving thermoplastic composite sheet is substantially free of unpolymerized resin materials. The phrase "substantially free of unpolymerized resin materials" as used herein means that chopped roving thermoplastic composite sheet does not include any unpolymerized resin materials (i.e., 0% monomers and/or oligomers) or includes a negligible amount of such materials. For example, the resin material may be a polyolefin, such as polypropylene. The monomer of polypropylene is propylene, which is a gas under ambient conditions. During propylene manufacturing, residual propylene is separated from polypropylene; so the resulting polypropylene does not include residual propylene. Therefore, a chopped roving thermoplastic composite sheet containing polypropylene does not include residual propylene. The chopped roving thermoplastic composite sheet includes between 20 and 80 weight percent of the thermoplastic resin. The weight percentage of thermoplastic resin is determined via an incineration method in compliance with ISO 1172 (1996).

The web or mesh of chopped rovings is not mechanically bonded and does not include a binder that bonds or adheres the chopped rovings together other than thermoplastic resin. As such, the thermoplastic resin and the web or mesh of chopped rovings are able to flow and conform to a mold or cavity when the chopped roving thermoplastic composite sheet is heated to above the melting temperature of the thermoplastic resin and when the chopped roving thermoplastic composite sheet is pressed within the mold or cavity.

BRIEF DESCRIPTION OF THE DRAWINGS

The present technology is described in conjunction with the appended figures.

Figure 1:
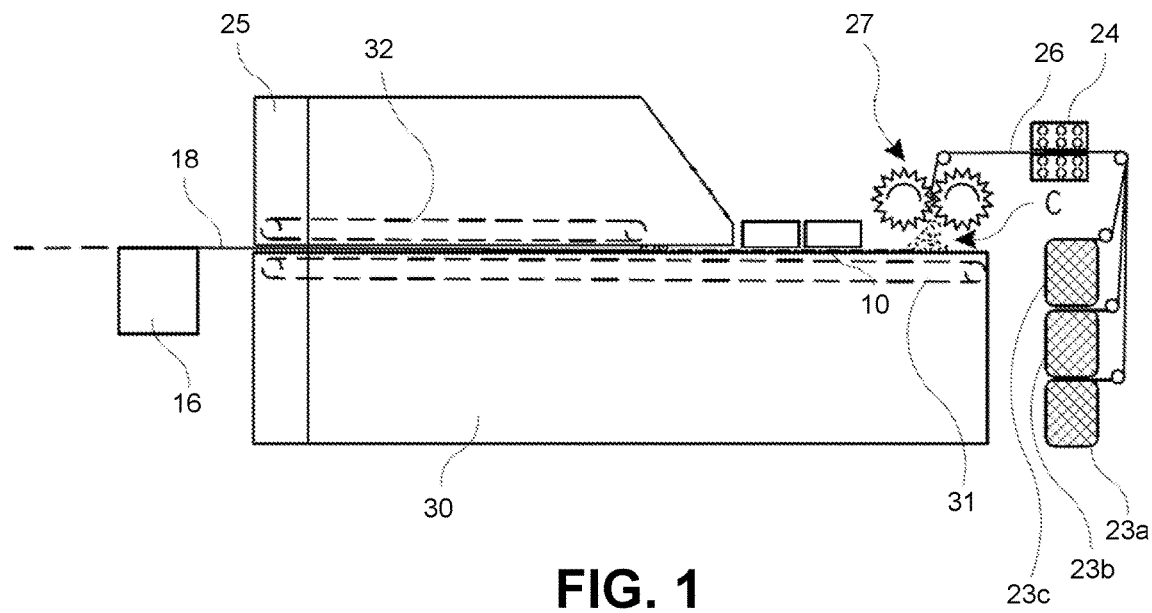
FIG. 1 illustrates a system that may be used to produce a chopped roving thermoplastic composite sheet.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The embodiments described herein are directed to thermoplastic composite sheets that are formed of chopped rovings and that are impregnated with a thermoplastic resin (hereinafter chopped roving thermoplastic composite sheets). The chopped roving thermoplastic composite sheets exhibit increased isotropic mechanical properties and increased conformability in comparison with conventional thermoplastic composite sheets. The increased isotropic properties are due mainly to the use of chopped rovings that are randomly oriented within the chopped roving thermoplastic composite sheet. The randomly oriented chopped rovings allow the strength of the chopped roving thermoplastic composite sheet to be far less directionally dependent than conventional fabric-based thermoplastic composite sheets. The increase conformability is due in part to the lack of mechanical and chemical bonding or coupling of the chopped rovings, when the composite sheet is heated above the melting or softening point of the thermoplastic resin. Since the chopped rovings are not mechanically or chemically bonded/coupled, the chopped rovings are able to move relative to one another during a thermoforming process. As such, the chopped rovings are able to flow, bend and conform to complex and tight geometric shapes often encountered in thermoforming molds. Stated differently, the chopped roving thermoplastic composite sheets have excellent conformability and are able to easily form into composite parts with deep draws and complex shapes or geometries. The chopped roving thermoplastic composite sheets may be formed into these complex shapes via high throughput processes such as compression molding and thermal forming. The chopped roving thermoplastic composite sheets exhibit high strength, stiffness, and impact resistance.

The use of chopped rovings, that are not mechanically or chemically bonded prior to the application and impregnation of thermoplastic resin, also allows thermoplastic resin to quickly penetrate into the web or mesh of chopped rovings, which greatly improves the speed of resin impregnation and thus, the speed of manufacturing of the composite sheet. The rate of resin impregnation is in accordance with Darcy's Law, which is provided below:

$$t = v_U \frac{\eta L^2}{2K_p(P_a - P_0)}$$

In the above equation, the time (t) needed for impregnating a fibrous substrate depends on the porosity ($U_u$) of the substrate, the resin viscosity ($\eta$), the flow length (L) of the resin, the applied pressure ($P_a$), the atmospheric pressure ($P_o$), and the permeability ($K_p$) of the substrate. The impregnation time (t) is proportional to the square of flow length (L), which is defined as the length that a molten thermoplastic resin travels during the impregnation process. Therefore, reducing the flow length can significantly increase the rate of impregnation of thermoplastic resin within the chopped roving web or mesh. In the present embodiments, new methods are developed for the manufacturing of chopped roving thermoplastic composite sheets in which the resin flow length is significantly reduced to achieve fast resin impregnation. The methods for manufacturing chopped roving thermoplastic composite sheets comprise: (1) distributing or dispensing long chopped rovings uniformly onto a moving belt to form a chopped roving web or mesh; (2) application of a thermoplastic resin onto the chopped roving web or mesh; (3) melting thermoplastic resin and pressing the resinated chopped roving web or mesh to impregnate the rovings; (4) cooling the impregnated chopped roving web or mesh to form the chopped roving thermoplastic composite sheet; and (5) cutting the chopped roving thermoplastic composite sheet to a desired length and width.

In another embodiment, chopped rovings and powder thermoplastic resin are dispersed simultaneously onto a moving belt. In this case the step of forming the chopped roving web or mesh and the step of applying the thermoplastic resin are combined into a single step. Simultaneously dispersing chopped rovings and powder thermoplastic resin ensures good distribution of the powder thermoplastic resin within the chopped roving web or mesh, which in turn minimizes the flow length and facilitates resin impregnation.

In one embodiment, thermoplastic resin is applied onto the chopped roving web or mesh by applying a powder thermoplastic resin onto the chopped roving web or mesh. The powder thermoplastic resin may be delivered using a powder application device. Due to the large interstitial spaces in the chopped roving web or mesh, the thermoplastic resin particles are able to fall into the interstices between the chopped rovings. As such, the powder thermoplastic resin particles easily penetrate deep into the interior of the chopped roving web or mesh, which significantly reduces the flow length of thermoplastic resin in the chopped roving web or mesh and greatly reduces the impregnation time in accordance with Darcy's law.

To improve resin distribution and further reduce impregnation time, a thermoplastic resin film may be placed under the chopped roving web or mesh. The resin film will melt and impregnate the chopped roving web or mesh from the bottom surface. Layered structures may be produced by employing multiple fiber dispensing devices (e.g., fiber choppers, fiber scattering devices, etc.) and multiple powder resin application devices. For example, a first layer of chopped rovings may be formed by dispensing chopped rovings from a first fiber dispensing device and a powder thermoplastic resin may be applied to the first layer of chopped rovings via a first powder application device. Subsequently, a second layer of chopped rovings may be formed atop the resinated first layer of chopped rovings by dispensing chopped rovings from a second fiber dispensing device on top of the first layer of chopped rovings. A powder thermoplastic resin may be applied to the second layer of chopped rovings via a second powder application device. Additional layers may likewise be formed.

A thermoplastic resin film and a powder thermoplastic resin may be combined in the layered structure. Alternatively, a thermoplastic resin sheet may be in situ extruded from an extruder with a sheet die. The extruded sheet of molten resin may facilitate resin impregnation within the chopped roving web or mesh. Pre-heating of chopped roving web or mesh may be needed to heat the chopped rovings web or mesh prior to the application of the extruded sheet of molten thermoplastic resin, such that the molten thermoplastic resin doesn't freeze when applied upon the chopped roving web or mesh. Because of the reduced flow length, much faster impregnation of the chopped roving web or mesh can be achieved than in conventional thermoplastic composite sheets, such as GMT or those that employ fabrics. The faster impregnation results in a significantly higher production efficiency in comparison with conventional products. In yet other embodiments, thermoplastic polymer fibers may be dispersed within the chopped roving web or mesh in order to reduce the flow length. Additional details on thermoplastic resins that may be employed in the present embodiments are provided below.

In some embodiments, distributing or dispensing long chopped rovings uniformly onto a moving belt includes in-line chopping of continuous rovings into long chopped rovings via a fiber chopping device (hereinafter fiber chopper). The fiber chopper may be positioned above the moving belt so that the long chopped rovings fall onto the moving belt as they are cut or chopped. Alternatively or additionally, pre-chopped rovings may be scattered or dispensed via a fiber scattering or dispensing device that is positioned above the moving belt.

The term chopped rovings relates to fibers that are chopped from continuous rovings or tows. The length of the chopped rovings is typically greater than, or equal to, ½ inch or 1 inch. In some embodiments, the length of the chopped rovings may be between ¼ inch and 5 inches, and more preferably between ½ inch and 2 inches. Due to the long fiber length in the chopped roving thermoplastic composite sheets, significant strength and stiffness is achievable. The rovings that are employed herein may be selected from, but are not limited to, the following types of fibers: glass fibers, carbon fibers, basalt fibers, metal fibers, ceramic fibers, cellulosic fibers, natural fibers, aramid fibers, inorganic fibers, polymer fibers, or combinations thereof. The rovings can be treated with coupling agents, which may improve interfacial bonding between the rovings and thermoplastic resin matrix.

Thermoplastic resin may include, but is not limited to, polyolefins, polypropylene (PP), high-density polyethylene (HDPE), polyamides (including PA6 and PA6,6), polyethylene terephthalate (PET), polybutylene terephthalate (PBT), polycarbonate (PC), polyphthalamide (PPA), acrylonitrile-butadiene-styrene (ABS), PC/ABS, thermoplastic polyurethane (TPU), polyphenylene sulfide (PPS), acetal (polyoxymethylene or POM) resins, polyethyleneimine (PEI), polyether ether ketone (PEEK), polyacrylonitrile, copolyacrylonitriles including poly(styrene-co-acrylonitrile) (SAN), or any combination thereof. In some embodiments, thermoplastic resin may be pressed into the chopped roving web or mesh via double belt press or mechanism.

As briefly described above, the chopped roving web or mesh is not mechanically or chemically bonded, prior to the application and impregnation of a thermoplastic resin, which means that the chopped roving web or mesh is composed of, or consists of, unbonded chopped roving segments. The term un-bonded implies that the chopped roving web or mesh is not mechanically or chemically coupled or bonded together, or coupled together via some other means. A common example of mechanically bonded or coupled fiber products are products that are intentionally mechanically entangled, commonly through a process called needling. Needling involves inserting rods, needles, or other objects through the fiber web or mesh in order to cause portions of the fibers to reorient within the web or mesh and thereby encourage or effect entanglement of the fibers. Reorienting and entangling of the fibers mechanically couples or bonds the fibers together. Needling, or other forms of mechanical entanglement, greatly increases the structural integrity of the fiber web, which enables the fiber web to be handled as a fiber substrate and exposed to external forces. Woven fabrics are mechanically coupled together via the weaving of the rovings or tows together.

Chemical bonding means applying a binder to a fiber mat, such that the bonded fiber mat can be handled in the processes such as winding and unwinding prior to the application of a thermoplastic resin. An example of chemically bonded fiber mat is chopped strand mat, in which chopped strands are bonded by a binder. Chopped strand mats typically comprise chopped strands that are randomly laid atop one another and bonded together with an applied binder or adhesive. The adhesive or binder bonds or adheres individual strands together. Typically, binders on the chopped strand mats are of thermoset-type, which form crosslinked structure that do not flow once cured. Common thermoset binders include unsaturated polyester binder.

In contrast to mechanically and/or chemically bonded fiber mats or sheets, the chopped rovings in the chopped roving web or mesh are merely laid atop one another with minimal physical engagement, prior to the application of a thermoplastic resin. As such, the chopped rovings form a fiber web or mesh without being mechanically or chemically bonded or coupled to one another. The chopped rovings remain in a non-mechanically and non-chemically bonded/coupled state until after thermoplastic resin is applied to the chopped roving web or mesh, heated and impregnated within the chopped roving web or mesh, and cooled to form the chopped roving thermoplastic composite sheet. As such, thermoplastic resin matrix itself functions as the material that bonds or couples the chopped rovings together. Since thermoplastic resin matrix is essentially the only material that couples or bonds the chopped rovings, when thermoplastic resin is heated and melted during thermoforming, the chopped rovings decouple, disengage, unfasten, or otherwise loosen from one another, which allows the chopped rovings to move relative to one another and to flow with the melted thermoplastic resin.

In addition, since the chopped roving web or mesh is not mechanically or chemically bonded/coupled, the chopped roving web or mesh does not essentially exhibit any structural integrity on its own, which means that the chopped roving web or mesh will not stay intact if appreciable external forces are applied to the chopped roving web or mesh or if the chopped roving web or mesh is handled or disturbed. For example, if the chopped roving web or mesh is tensioned or torqued, the chopped roving web or mesh will not stay intact. Instead, the chopped rovings will disengage, move apart, and separate due to the external force. Similarly, if the chopped roving web or mesh is handled by a user, the lack of mechanical or chemical bonding will cause the chopped rovings to disengage and separate. As such, the chopped roving web or mesh cannot be handled, moved, rolled, or processed as conventional fabrics, nonwovens, or chopped strand mats are handled. In describing the unbounded characteristic of the chopped roving web or mesh, it should be appreciated that a minimal degree of physically entanglement or engagement will likely occur due to the random orientation of the chopped rovings in the web or mesh, but that in general the chopped rovings remain uncoupled or unbonded from one another so that the fiber web or mesh has minimal structural integrity prior to application and impregnation of thermoplastic resin.

Mechanically and/or chemically bonded fiber mats are greatly preferred for manufacturing purposes since mechanical and/or chemical bonding of the fibers allows the fiber sheets to be handled and processed. For example, mechanically and/or chemically bonded fiber sheets allow the fiber sheets to be manufactured at a manufacturing facility as an intermediate fiber substrate. The intermediate fiber substrate may be shipped and stored for later processing, such as the application of a resin. Mechanically and/or chemically bonded fibers also allow the intermediate fiber substrate to be rolled, pushed, pulled, and/or otherwise handled on a processing line during application and impregnation of the resin.

In contrast, the chopped roving web or mesh described herein does not form intermediate bonded fiber substrates and is unable to be manipulated in like manner since such manipulation will cause separation of the chopped rovings and/or deformation of the chopped roving web or mesh. Since the chopped roving web or mesh described herein does not form intermediate bonded fiber substrates, the formation of the chopped roving thermoplastic composite sheet occurs in a single manufacturing process or step, which ensures that the chopped roving web or mesh remains intact prior to the application of the thermoplastic resin.

Once the chopped roving thermoplastic composite sheet is formed, the non-mechanically and/or non-chemically bonded chopped rovings greatly enhances the formation of molded products. For example, since the chopped rovings are not mechanically or chemically bonded, the chopped rovings are able to freely move relative to one another when thermoplastic resin is melted during a molding or thermoforming process. The chopped rovings are able to flow with the melted thermoplastic resin. This increased fiber movement allows the chopped rovings to easily flow, move, bend, and flex into tight and complex shapes or formations within a mold. In contrast, mechanically and/or chemically bonded fiber mats or sheets greatly resist movement, bending, and/or flexing of fibers into tight and complex shapes or formations since the fibers are mechanically and/or chemically locked relative to one another.

GMT is a common example of a thermoplastic composite sheet that includes mechanically bonded fibers in the form of a needled mat. To form a needle mat, a carding process is typically used to open fiber bundles to achieve more random fiber distribution. Carding is a time-consuming process, which adds to the cost of manufacturing. Opening of the fiber bundles via carding or other methods increases the thickness of fiber mat and, therefore, increases the impregnation time of thermoplastic resin, since thermoplastic resin needs to travel longer flow length to impregnate a fluffy mat. Carded fiber products are also subjected to needling processes as described above, which mechanically entangles and locks the fibers together.

In contrast to conventional fiber substrates, the chopped roving web or mesh described herein is formed of unopened chopped rovings or chopped rovings that are not opened via mechanical means. Rovings or tows of small bundle size can be used to form the chopped roving web or mesh. For example, rovings or tows with the tex number <100 may be used. Tex of a roving is defined as the mass in grams per 1,000 meters of roving length; and is determined according to ISO 1889 (2009). The small bundle size ensures a relatively uniform distribution of chopped rovings in the chopped roving web or mesh. For glass rovings, assembled rovings are preferred. An assembled roving is manufactured by assembling multiple small tex strands into a larger roving. The individual strands in the assembled roving may have a tex number of between 20 and 100. By assembling multiple small tex strands together, the tex number of an assembled roving may be 2,000 or higher. Chopping of the assembled roving results in the separation of small strands from each other and the formation of individual chopped small strands. Assembled rovings of other fibers, such as basalt fibers, may also be used. For non-assembled fiber products, rovings or tows with small bundle sizes can be used. Small tow carbon fibers, for example carbon fiber tows with a tow size less than 10k may be used. As known in the art, the term 10k refers to a tow size of 10,000 filaments. Chopped rovings are formed by chopping/cutting rovings or tows to a desired length. A web or mesh of chopped rovings is formed via dispensing or scattering of the chopped rovings directly onto a moving belt, without any additional process of opening fiber bundles. The advantages of using unopened fiber bundles include: (1) the formation of large interstitial spaces in the chopped roving web or mesh to facilitate the penetration of a thermoplastic resin (such as powders) into the interstices between the chopped rovings; (2) reducing the cost of manufacturing, by skipping the process to form an intermediate fiber substrate, and the like.

In addition, the chopped rovings are not subjected to a post processing after the rovings are dispersed on the moving belt from the fiber chopper and/or fiber scattering device. For example, typically chopped fiber products are subjected to carding processes or other processes after the fibers are cut, which processes are designed to open the fiber bundles so that the fiber substrate is composes mainly of individual fibers and not rovings. The fibers may also be subjected to blowing operations or vacuum suction operations immediately prior to and/or after the fibers are positioned on a belt or other surface. In contrast to these products, the chopped rovings are not subjected to carding or opening process or other processes after the chopped rovings fall onto the moving belt. This results in the chopped roving web or mesh having a relatively large interstitial spaces, which reduces the flow length of thermoplastic resin during resin impregnation.

In further contrast to conventional fiber substrates, the chopped rovings of the chopped roving web or mesh are essentially arranged in a two dimensional plane—e.g., the X-Y plane. Stated differently, the chopped roving web or mesh is essentially free of chopped rovings that are oriented in the Z direction, which is perpendicular to the X-Y plane. The chopped rovings are oriented in the two dimensional plane due in part to the chopped roving web or mesh not being subjected to a needling process, or any other mechanical entangling process, in which the chopped rovings are reoriented within the web or mesh. Rather, the rovings are merely chopped or dispersed and allowed to randomly orient and lay atop one another on the moving belt to form the chopped roving web or mesh.

The chopped roving web or mesh comprises un-opened fiber bundles and is more porous than conventional chopped fiber substrates. As used herein, the term "chopped roving" means rovings that are cut directly from continuous rovings and form a web or mesh without mechanically opening fiber bundles. Since the rovings are not mechanically opened, the chopped rovings typically include at least 90% unopened fiber bundles, and more commonly at least 95% unopened fiber bundles. The non-mechanical and/or non-chemical bonding allows the chopped roving web or mesh to remain very open and porous, which greatly increases the ability of thermoplastic resin to penetrate into the interior of the chopped roving web or mesh. For example, the increased openness of the chopped roving web or mesh allows thermoplastic powder material to easily fall into the interstitial space between chopped rovings.

As briefly described, thermoplastic resin may be applied to the chopped roving web or mesh in a variety of ways including as a powder, as a film, as melt thermoplastic resin sheet, as polymer fibers, or any combination thereof. In a specific embodiment, powder thermoplastic resin is applied to the chopped roving web or mesh. The resin particles are able to penetrate through the interstitial space between chopped rovings and into the interior of the chopped roving web or mesh. Penetration of the powder thermoplastic resin into the chopped roving web or mesh greatly increases dispersion of thermoplastic resin through the chopped roving web or mesh and reduces flow length when thermoplastic resin is exposed to sufficient heat. Penetration of the powder thermoplastic resin into the chopped roving web or mesh also aids in minimizing voids or areas within the chopped roving web or mesh in which thermoplastic resin is absent.

The chopped roving thermoplastic composite sheets are composed of fully polymerized thermoplastic resins. Stated differently, the chopped roving thermoplastic composite sheets do not include unpolymerized or partially polymerized materials, such as partially polymerized b-stage resins or materials that are often employed in thermoset prepregs. Partially polymerized b-stage prepregs may increase the flowability of the resin within the prepregs, but these materials often require special handling, such as refrigeration, and often have an expiration date upon which the b-stage material will begin to degrade. Partially polymerized b-stage prepregs are generally tacky and typically require the use of two release liners that are positioned on opposite sides of the prepreg. In contrast, the fully polymerized chopped roving thermoplastic composite sheets may be stored at ambient temperatures essentially indefinitely and require far less care in handling.

Fully polymerized thermoplastic resins may include, but is not limited to, polyolefins, polypropylene (PP), high-density polyethylene (HDPE), polyamides (including PA6 and PA6,6), polyethylene terephthalate (PET), polybutylene terephthalate (PBT), polycarbonate (PC), polyphthalamide (PPA), acrylonitrile-butadiene-styrene (ABS), PC/ABS, thermoplastic polyurethane (TPU), polyphenylene sulfide (PPS), acetal (polyoxymethylene or POM) resins, polyethyleneimine (PEI), polyether ether ketone (PEEK), polyacrylonitrile, copolyacrylonitriles including poly(styrene-co-acrylonitrile) (SAN), or any combination thereof. In preferred embodiments, polypropylene is used as the thermoplastic resin, because of its low cost, low density, and low melting point.

Having described several aspects of the embodiments generally, additional aspects will be evident with reference to the description of the several drawings provided below.

Systems

Referring now to FIG. 1, illustrated is a system that may be used to produce chopped roving thermoplastic composite sheets. The system of FIG. 1 is capable of producing the chopped roving thermoplastic composite sheets in a continuous process, in which the chopped roving web or mesh is continually or constantly in movement through the system. As noted herein, the ability of the system to produce the chopped roving thermoplastic composite sheets in a continuous process is important since the chopped roving web or mesh is not able to form an intermediate fiber substrate due to the chopped rovings not being mechanically or chemically bonded.

As illustrated in FIG. 1, the system includes a double belt mechanism that includes an upper belt 32 and a lower belt 31. Typical belts used in the double belt mechanism include, but not limited to, fiber-reinforced Teflon belts and stainless-steel belts. The upper belt 32 is positioned atop the lower belt 31 and the two belts are configured to compress or squeeze the chopped roving web or mesh that is passed through the double belt mechanism. At least a portion of the double belt mechanism is positioned within an oven 30. In some embodiments, the top belt 32 is fully enclosed within the oven 30. The lower belt 31 has a longitudinal length that is substantially longer than the upper belt 32 so that at least a portion of the lower belt 31 extends outward from the upper belt 32. As illustrated, the lower belt 31 may extend outward from the upper belt 32 by between 2 and 15 feet and more commonly between 3 and 10 feet.

The lower belt 31 typically extends outward from the upper belt 32 so that one or more of the components of the system are positioned atop the lower belt 31. For example, a fiber applicator 27 is positioned above the lower belt 31. The fiber applicator 27 is configured to disperse chopped rovings C atop the lower belt 31 as the lower belt is moved under and past the fiber applicator 27. The chopped rovings C are dispersed atop the lower belt 31 to form the chopped roving web or mesh. As described herein, the chopped rovings C are not subjected to post processing that materially changes the chopped rovings C (e.g., carding, needling, binder application, etc.) after the chopped rovings C are dispersed via the fiber applicator 27. As such, the chopped rovings C remain in essentially the same state or condition until thermoplastic resin is applied and impregnated within the chopped roving web or mesh.

The system also includes a resin applicator 10 that is positioned atop the lower belt 31 and above or adjacent the chopped roving web or mesh. Resin applicator 10 is typically positioned distally of the fiber applicator 27 and is configured to apply a thermoplastic resin to the chopped roving web or mesh as the chopped roving web or mesh is moved past and typically underneath resin applicator 10. In a specific embodiment, resin applicator 10 is a powder application device that is configured to disperse thermoplastic resin particles onto the chopped roving web or mesh as the chopped roving web or mesh is moved past the powder application device. As described above, in such embodiments, the powder thermoplastic resin falls into interstices between the chopped rovings of the chopped roving web or mesh.

In another specific embodiment, the resin applicator 10 is a powder application device which is positioned under the fiber applicator 27. In such embodiments, the chopped rovings C from the fiber applicator 27 and the thermoplastic resin powder from the resin applicator 10 fall together, or simultaneously, atop the lower belt 31, thereby forming a resinated chopped roving web or mesh in which the thermoplastic resin powder is dispersed within the chopped roving web or mesh.

Figure 2:
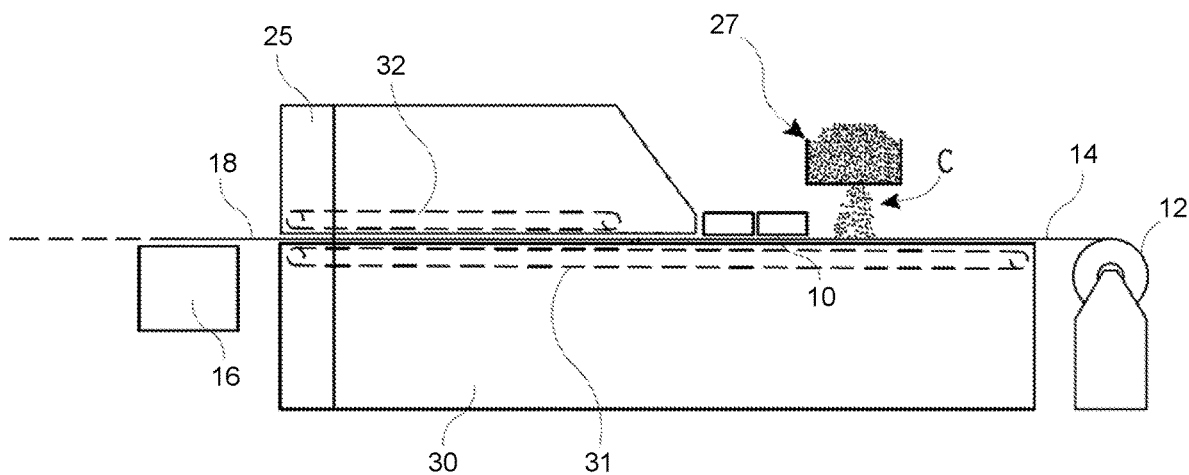
FIG. 2 illustrates another system that may be used to produce a chopped roving thermoplastic composite sheet.
Figure 3:
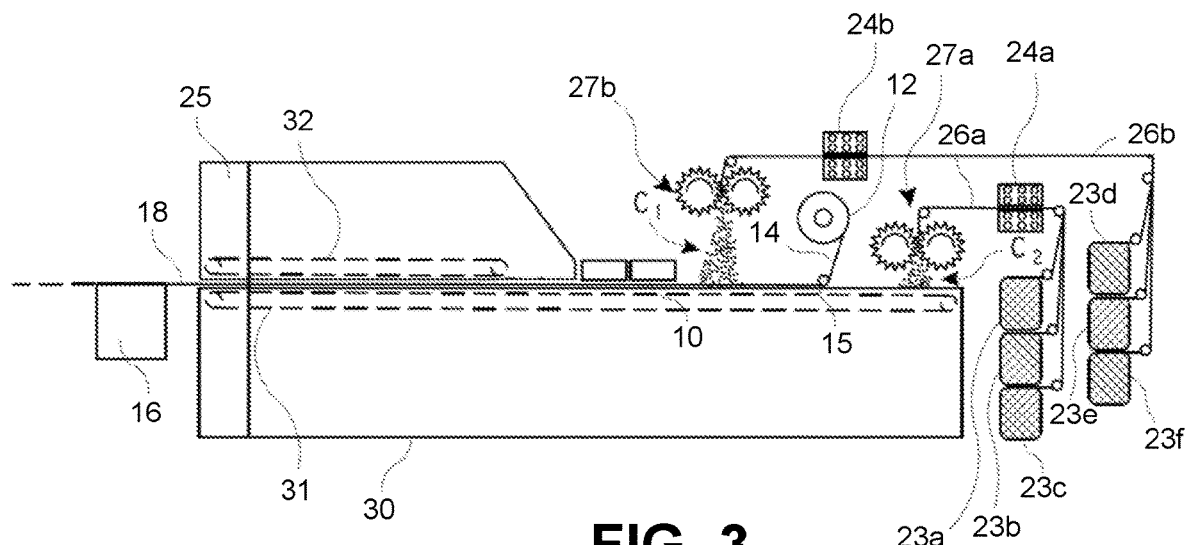
FIG. 3 illustrates another system that may be used to produce a chopped roving thermoplastic composite sheet.

In another embodiment, resin applicator 10 is a roller about which a thermoplastic film is wound. In such embodiments, thermoplastic resin is applied to the chopped roving web or mesh by unrolling thermoplastic film from the roller. A roller 12 and thermoplastic film 14 is shown in FIGS. 2 and 3, which may replace the component 10 in FIG. 1 and/or which may be used in addition to the component 10. When a thermoplastic film 14 is used, the roller 12 is typically positioned proximally of the fiber applicator 27 so that thermoplastic film 14 is unrolled and positioned atop the lower belt 31 proximally of the fiber applicator 27. The chopped rovings C may be dispersed atop thermoplastic film 14 so that thermoplastic film 14 forms a bottom layer of the chopped roving web or mesh. In other embodiments, thermoplastic film 14 may be unrolled atop the chopped roving web or mesh (see FIG. 3) so that thermoplastic film forms a top layer of the chopped roving web or mesh. In yet other embodiments, thermoplastic film 14 may form both a bottom layer and a top layer of the chopped roving web or mesh.

In another embodiment, resin applicator 10 is an extruder device that is configured to extrude a molten thermoplastic resin sheet atop the chopped roving web or mesh. Thermoplastic resin sheet may be in situ extruded from an extruder that is positioned atop the chopped roving web or mesh. The extruded sheet of molten resin may penetrate into the chopped roving web or mesh immediately after extrusion. In yet another embodiment, resin applicator 10 is a fiber chopper or a fiber scattering device that is configured to disperse thermoplastic resin fibers atop or within the chopped roving web or mesh. This embodiment is described in greater detail herein below.

The system may include one or more of resin applicators described in the preceding paragraphs. For example, the system may include a roller 12 that unrolls a thermoplastic film 14 and may include a powder applicator 10. Thermoplastic fibers may also be dispersed within or atop the chopped roving web or mesh and/or a melt resin may be extruded onto the chopped roving web or mesh. In this manner, the chopped roving web or mesh may receive thermoplastic resin from 1, 2, 3, or even 4 different sources, which may improve the penetration and impregnation of thermoplastic resin into the chopped roving web or mesh.

In a specific embodiment, the fiber applicator 27 is a fiber chopper that is configured to cut the rovings 26 into chopped rovings C, which form the chopped roving web or mesh. A typical fiber chopper may include a cutting roller onto which multiple blades are mounted and a backup roller. The rotation of the cutting roller cuts rovings against the backup roller and disperses chopped rovings to form a chopped roving web or mesh. The fiber chopper is positioned above the lower belt 31 so that as the rovings 26 are cut into individual chopped rovings C, the chopped rovings C fall atop the lower belt 31 and form the chopped roving web or mesh. The rovings 26 may be provided via one or more spools, 23*a-c*, that may be positioned on a creel. The roving that is provided by each spool, 23*a-c*, may be similar in type or size or may differ from the roving provided by another spool. Thus, the chopped roving web or mesh may be formed from the same type and/or size of rovings 26 or may be formed from a variety of different roving types and/or sizes. For example, the chopped roving web or mesh may include a combination of rovings of different size and/or a combination of rovings of different fiber types. In some instances, two or more different types of rovings, including but not limited to glass fibers, carbon fibers, and aramid fibers, may be cut by the fiber chopper simultaneously, thereby forming a hybrid chopped roving web or mesh. When multiple roving types or roving sizes are dispersed atop the lower belt 31 via the fiber applicator 27, the multiple roving types and/or sizes uniformly disperse or mix in forming the hybrid chopped roving web or mesh.

In one embodiment, the multiple roving types or roving sizes include reinforcing rovings and also include polymer resin fibers that are configured to melt within the oven 30. In such embodiments, the polymer fibers function as one of the sources of the thermoplastic resin or the primary source of the thermoplastic resin. In such embodiments, the fiber applicator 27 (e.g., fiber chopper or fiber scattering device) may function as both the fiber applicator 27 and the resin applicator 10. When the fiber applicator 27 functions as the resin applicator 10, a separate component (i.e., resin applicator 10) may be excluded from the system.

In one embodiment, the reinforcing rovings and the polymer fibers are dispersed uniformly atop the lower belt 31 so that a single homogenous chopped roving web or mesh is produced. For example, the fiber chopper may cut both the polymer fibers and the reinforcing rovings so that the polymer fibers and the reinforcing rovings fall atop the lower belt 31 uniformly and form the chopped roving web or mesh. In another embodiment, the reinforcing rovings and the polymer fibers may be dispersed so that the different fibers form separate layers atop the lower belt 31. In such embodiments, the chopped roving web or mesh includes multiple layers of different fibers. In a specific embodiment, the reinforcing fibers are glass fibers and the polymer fibers are polypropylene fibers.

In some embodiments, the fiber applicator 27 may be a fiber scattering device (see fiber applicator 27 of FIG. 2). A typical fiber scattering device may include a hopper, a fiber feeding device, a scattering roller, and a brush-off roller. In such embodiments, the system would not include the rovings 26 or the spools 23*a-c*. Rather, the fiber scattering device would be positioned above the lower belt 31 and would be configured to scatter or disperse pre-cut chopped roving segments C atop the lower belt 31 to form the chopped roving web or mesh. The pre-cut chopped roving segments C may be loaded or positioned within a hopper that is accessible to the fiber scattering device. The chopped roving segments C may be scattered uniformly atop the lower belt 31 to form a chopped roving web or mesh. The chopped roving segments C may include one roving type or size, or may include different roving types or sizes.

The fiber scattering device may disperse the multiple roving types and/or sizes to form a uniform or layered chopped roving web or mesh as previously described. For example, the fiber scattering device may be configured to scatter reinforcing rovings and polymer fibers that are configured to melt within the oven 30. The fiber scattering device may disperse the polymer fibers and the reinforcing rovings so that the fibers and rovings fall atop the lower belt 31 to form a uniform or layered chopped roving web or mesh. In such instances, the fiber scattering device may function as both the fiber applicator and resin applicator so that the system does not include component 10. In other embodiments, the fiber scattering device may be used in combination with the resin applicator 10 so that a thermoplastic resin is applied to the chopped roving web or mesh from multiple sources.

In some embodiments, the thermoplastic resin may be a powder or powders. The fiber scattering device may be configured so that both the chopped rovings C and the thermoplastic resin powder falls simultaneously atop the lower belt 31 to form a resinated chopped roving web or mesh in which the thermoplastic resin powder is dispersed within the chopped roving web or mesh. The fiber scattering device may have a partitioned hopper that includes separate compartments for the chopped rovings and for the thermoplastic resin powder respectively. Alternatively, separate hoppers may be used for the chopped rovings and the thermoplastic resin powders. The chopped rovings and thermoplastic resin powder may be scattered or dispensed simultaneously via the scattering device to form a resinated chopped roving web or mesh.

In some embodiments, the resin applicator 10 is a powder application device which is positioned under the fiber scattering device 27. In such embodiments, the chopped rovings C that are dispersed from the fiber scattering device 27 and the thermoplastic resin powder that is applied from the resin applicator 10 fall together atop the lower belt 31, thereby forming a resinated chopped roving web or mesh in which thermoplastic resin powder is dispersed within the chopped roving web or mesh.

In some embodiments, the chopped rovings C may include a sizing composition having a coupling agent that promotes bonding between the chopped rovings C and thermoplastic resin. In such instances, the bond between thermoplastic resin and the chopped rovings C may be significantly strengthened or enhanced. In specific embodiments, the fiber sizing contains a mixture of silane coupling agent, polymeric film former, and other additives that are designed to enhance the interfacial bonding between the chopped rovings and a thermoplastic resin matrix. Specifically, a sizing composition comprising a coupling agent (i.e., maleated polypropylene) may be used for the production of chopped roving polypropylene composite sheets to enhance the bonding between fibers and PP resin.

When the fiber applicator 27 is a fiber chopper, the system may include a drying mechanism 24 that is configured to dry the rovings 26 as the rovings 26 are unwound from the respective spools, 23a-c, and before the rovings 26 are cut via the fiber chopper. The drying mechanism 24 may be a tubular heater through which the rovings 26 are pulled. The system may include a single tubular heater through which all the rovings 26 are pulled, or may include a tubular heater through which each roving is individually pulled as it is unwound from the respective spool, 23a-c.

The fiber applicator 27 disperses the chopped rovings C so that the rovings fall atop the lower belt 31 and form the chopped roving web or mesh. The chopped rovings C are randomly oriented or arranged atop the lower belt 31 and form a chopped roving web or mesh having a thickness and/or density that depends on the speed of the lower belt 31, the dispersing speed of the fiber applicator 27, the number and/or size of chopped rovings C, and the like. The system may also include one or more heaters (not shown) that are position atop the lower belt 31 and that are configured to heat the chopped roving web or mesh. The one or more heaters may be positioned prior to the resin applicator 10 and may function to heat the chopped roving web or mesh so that chopped rovings are not cold when the resin material is applied to the chopped roving web or mesh.

The chopped roving web or mesh is typically not subjected to chemical or mechanical bonding and thus, the chopped roving web or mesh is typically un-bonded or un-adhered as previously described. Specifically, prior to application of thermoplastic resin, the chopped roving web or mesh is typically not subjected to a binder application process (e.g., curtain coater, spray mechanism, and the like) that bonds or adheres the chopped rovings together and the chopped roving web or mesh is typically not subjected to a mechanical entangling process, such as mechanical needling. More particularly, the system does not include an entangling device that entangles or mechanically couples the chopped rovings of the chopped roving web or mesh. The system also does not include a binder application device that applies a binder to the chopped rovings. Because the chopped rovings are not mechanically or chemically bonded, the chopped rovings can move, flow, and shift relative to one another upon melting of thermoplastic resin. This movement does not occur when a thermoset binder is applied to chopped rovings since the cured thermoset binder adheres or bonds the chopped rovings together.

After the chopped roving web or mesh is coated with the thermoplastic resin, the coated chopped roving web or mesh is then subjected to a press mechanism that facilitates in a wet-out of the chopped rovings by the thermoplastic resin. The pressing function is typically performed by the upper belt 32 and the lower belt 31, which form a double belt compression mechanism. The upper belt 32 and lower belt 31 compress the thermoplastic resin coated chopped roving web or mesh as the chopped roving web or mesh is passed through the oven 30. The compression of the coated chopped roving web or mesh aids in the melting and impregnation or saturation of the chopped roving web or mesh.

Fully saturating the chopped roving web or mesh means that thermoplastic resin impregnates the chopped roving web or mesh from one surface of the chopped roving web or mesh to an opposite surface of the chopped roving web or mesh. Stated differently, fully saturating the chopped roving web or mesh means that the thermoplastic resin is disposed through an entire thickness of the chopped roving web or mesh. Full saturation of the chopped roving web or mesh ensures that the chopped rovings remain in position, and do not fall out of, the chopped roving thermoplastic composite sheet. Stated differently, since the chopped rovings are not mechanically or chemically bonded, the thermoplastic resin functions as the matrix that secures the chopped rovings in position. As such, if the thermoplastic resin did not impregnate the chopped roving web or mesh through the entire thickness, at least a portion of the chopped rovings would not contact the thermoplastic resin and thus, these rovings would fall out of the chopped roving thermoplastic composite sheet. In some embodiments, the pressing function may be achieved by one or more calendars or rollers that press or squeeze the thermoplastic resin through the chopped roving web or mesh.

The lower and upper belts, 31 and 32, pass the resinated chopped roving web or mesh through the oven 30. The temperature of the oven 30 is maintained at a temperature that ensures complete melting of thermoplastic resin. Stated differently, the oven 30 is maintained at a temperature above the melting temperature of the thermoplastic resin. For polypropylene resin, the oven may be maintained at a temperature of 200° C. or higher, which is above the melting point of polypropylene. The resinated chopped roving web or mesh may be exposed to the oven 30 for a time which is sufficient to ensure wet out or impregnation of the chopped roving web or mesh. For example, for a thermoplastic resin composition that includes polypropylene, the residence time of the resinated chopped roving web or mesh in the oven 30 may be about 2 minutes or more to ensure a wet out or impregnation of the chopped roving web or mesh with molten polypropylene.

The resulting chopped roving thermoplastic composite sheet is substantially free of unpolymerized polymer materials. Stated differently, the chopped roving thermoplastic composite sheets are composed of, or consist of, fully polymerized thermoplastic resins and do not include unpolymerized or partially polymerized materials, such as partially polymerized b-stage resins or materials. Thus, unlike some other composite sheets, such as sheet molding compound (SMC), the chopped roving thermoplastic composite sheet does not include a residual monomer or oligomer content.

In some embodiments, a distal end of the oven or enclosure 30 includes a cooling mechanism 25 that is configured to cool a chopped roving thermoplastic composite sheet 18. The cooling mechanism 25 may cool the chopped roving thermoplastic composite sheet 18 in order to allow the chopped roving thermoplastic composite sheet 18 to be cut to shape, to be handled by an individual, to reduce or prevent warpage of the chopped roving thermoplastic composite sheet 18, or for any other reason. The cooling mechanism 25 typically cools the chopped roving thermoplastic composite sheet 18 to below 50° C. and more commonly to at or near ambient temperature, which allows the chopped roving thermoplastic composite sheet 18 to be handled by an individual without burning or harming the individual. The cooling mechanism 25 may include chilled water cooling or any other form of cooling.

The system may also include a cutting mechanism 16 that is configured to cut the chopped roving thermoplastic composite sheet 18 to desired length and width, which may be stacked atop one another. In other embodiments, the system may include a winding mechanism that is configured to wind the chopped roving thermoplastic composite sheet into a roll product. The system of FIG. 1 is designed so that the process is performed in a time of 20 minutes or less, and more commonly 10 minutes or less. In some embodiments, the process may be performed in 5 minutes or less.

Although the lower belt 31 is illustrated as extending from the inlet of the oven 30, in some embodiments the lower belt 31 may be fully enclosed within the oven 30, or within a hood or cover of the oven. In such embodiments, the lower belt 31 extends beyond the distal or front edge of the upper belt 32 so that the other components of the system (i.e., the fiber applicator 27, resin applicator 10, etc.) are able to remain positioned above the lower belt 31.

FIG. 2 illustrates a system in which the fiber applicator 27 is a fiber scattering device. As previously described, the fiber scattering device is configured to scatter or disperse pre-cut chopped roving segments C that are loaded or positioned within a hopper. In some embodiments, the fiber scattering unit may be replaced by, or used in addition to, a fiber chopper. In such embodiments, the system of FIG. 2 may include a fiber chopper and/or fiber scattering device.

A roller 12 is positioned adjacent the lower belt 31 and is configured to direct a thermoplastic resin film 14 onto and atop the lower belt 31. The chopped roving segments C are uniformly scattered atop thermoplastic resin film 14 to form a chopped roving web or mesh atop the thermoplastic resin film 14. In some embodiments, the roller 12 may be positioned after the fiber applicator 12 so that the thermoplastic resin film 14 is unwound or unrolled atop the chopped roving web or mesh. The system of FIG. 2 may include the various other components described herein, such as the resin applicator 10, the cutting mechanism 16, the cooling mechanism 25, and the like. The thermoplastic resin film, chopped roving web or mesh, and any other materials such as powder thermoplastic resin, are moved into the oven 30 and heated so that thermoplastic resin melts and impregnates the chopped roving web or mesh.

In some embodiments, a fabric or nonwoven mat may be rolled about the roller 12 instead of the thermoplastic resin film 14. The system may be configured to unwind the fabric or nonwoven mat from the roller 12 and to move the fabric or nonwoven mat atop the lower belt 31 so that the chopped rovings C are positioned above the fabric or nonwoven mat and form a chopped roving web or mesh layer above the fabric or nonwoven mat. In such embodiments, a layered or hybrid chopped roving thermoplastic composite sheet may be formed of the chopped roving web or mesh and the fabric or nonwoven mat. A thermoplastic resin film 14 may also be employed in such embodiments and may be positioned adjacent the fabric or nonwoven mat or adjacent the chopped roving web or mesh. The layered or hybrid chopped roving web or mesh may be subjected to the resin applicator 10, the double belt mechanism, and the oven 30 such that the thermoplastic resin is dispersed within and fully saturates the layered or hybrid chopped roving web or mesh.

FIG. 3 illustrates a similar system to FIGS. 1 and 2 except that the system includes multiple fiber applicators, which may be either fiber choppers as illustrated in FIG. 1, fiber scattering devices as illustrated in FIG. 2, or a combination of fiber choppers and fiber scattering devices. While FIG. 3 illustrates the use of two fiber choppers, it should be realized that either fiber chopper, or both fiber choppers, may be replaced with a fiber scattering device, or that an additional fiber chopper or fiber scattering device may be employed within the system.

The system of FIG. 3 includes a first fiber applicator 27a and a second fiber applicator 27b that are each positioned atop the lower belt 31 and that are each configured to disperse chopped rovings $C_2$ and $C_1$ atop the lower belt to form a chopped roving web or mesh. When the first fiber applicator 27a is a fiber chopper, the first fiber applicator 27a cuts first rovings 26a that are unwound from one or more spools, 23a-c. The first rovings 26a may pass through a first roving heater 24a that dries the first rovings 26a. The first rovings 26a are cut and form first chopped rovings $C_2$. When the first fiber applicator 27a is a fiber scattering device, the first fiber applicator 27a disperses pre-cut first chopped rovings $C_2$ from a hopper or other holding device. The first chopped rovings $C_2$ fall atop the lower belt 31 and form a first layer of the chopped roving web or mesh. The thickness and/or density of the first layer may be controlled based on the speed of the first fiber applicator 27a, the speed of the lower belt 31, and/or the number and sizes of individual rovings 23a-c or pre-cut chopped rovings.

When the second fiber applicator 27b is a fiber chopper, the second fiber applicator 27b cuts second rovings 26b that are unwound from one or more spools, 23d-f. The second rovings 26b may pass through a second roving heater 24b that dries the second rovings 26b. The second rovings 26b are cut to form second chopped rovings $C_1$. When the second fiber applicator 27b is a fiber scattering device, the second fiber applicator 27b disperses pre-cut second chopped rovings $C_1$ from a hopper or other holding device. The second chopped rovings $C_1$ fall atop the thermoplastic resin film 14 and/or the first layer of the chopped roving web or mesh to form a second layer of the chopped roving web or mesh. The thickness and/or density of the second layer may be controlled based on the speed of the second fiber applicator 27b, the speed of the lower belt 31, and/or the number and sizes of individual rovings 23d-f or pre-cut chopped rovings.

The resulting chopped roving web or mesh may have a layered or hybrid configuration in which at least one property of the first layer is different than a property of the second layer. The hybrid layer may include a mixture of the chopped rovings from the first and second fiber applicators, 27a and 27b. The properties may differ in fiber type, fiber length, fiber diameter, roving or layer density, layer thickness, and the like. For example, the first layer and/or the second layer may include, or consist of, polymer fibers that are configured to melt within the oven 30 and fully saturate the layered or hybrid chopped roving web or mesh. The first fiber applicator 27a and/or the second fiber applicator 27b may be configured to disperse the polymer fibers within the first layer and/or second layer of the layered or hybrid chopped roving web or mesh. In other embodiments, the first and second chopped rovings, $C_2$ and $C_1$, may be different roving types, different roving sizes, and/or have different roving characteristics.

The system may also include a roller 12 about which a thermoplastic resin film 14, or in some embodiments a fabric or mat, is positioned. When the system includes a roller 12, the thermoplastic resin film 14 is unwound from the roller 12 and is moved atop the lower belt 31. In some embodiments, the thermoplastic resin film 14 may form a bottom layer of the hybrid chopped roving web or mesh. In other embodiments, the thermoplastic resin film 14 is unwound atop a chopped roving web or mesh formed by the first chopped rovings $C_2$. A roller 15 may be positioned above the lower belt 31 to properly direct the thermoplastic resin film 14 onto and atop the chopped roving web or mesh. The roller 12 may be positioned between the first fiber applicator 27a and the second fiber applicator 27b so that thermoplastic resin film 14 is sandwiched between two layers of the chopped roving web or mesh. In other instances, the roller 12 may be positioned distally of the second fiber applicator 27b so that the thermoplastic resin film 14 may be positioned atop the two layers of the chopped roving web or mesh. The thermoplastic resin film 14 and the chopped roving web or mesh may then be moved through the system to apply a thermoplastic resin (e.g., powder thermoplastic resin, thermoplastic resin melt, and/or polymer fibers), to melt the thermoplastic resin, and/or to cut the resulting chopped roving thermoplastic composite into sheets. It should be noted that in some embodiments, the system may not include the resin applicator 10. In such embodiments, the thermoplastic resin may be provided by the thermoplastic resin film 14 and/or polymer fibers.

In some embodiments a filler material may be added to the chopped roving thermoplastic composite sheet. The filler material, or filler materials, may be added to improve specific properties of the chopped roving thermoplastic composite sheet and/or to lower a cost of the chopped roving thermoplastic composite sheet. For example, the filler material, or filler materials, can affect the strength, toughness, heat resistance, flame retardancy, color, etc. of the chopped roving thermoplastic composite sheet. Filler materials that can be added to the chopped roving thermoplastic composite sheet include, but are not limited to, calcium carbonate, kaolin, talc, silica, titanium dioxide, alumina trihydrate, carbon black, and nanofillers such as carbon nanotubes and graphene.

In a specific embodiment, it may be desirable to decrease the density of the chopped roving thermoplastic composite sheet. Such composite sheets may be generally referred to as lightweight chopped roving thermoplastic composite sheet (hereinafter lightweight composite sheets), since they are lighter in density than conventional chopped roving thermoplastic composite sheets. Lightweight composite sheets may be particularly useful in applications where weight is an issue or concern. The density of the chopped roving thermoplastic composite sheet may be reduced by adding a lightweight filler material to the chopped roving thermoplastic composite sheet. The term "lightweight filler material" means a material that has a density of between 0.1 and 1.0 g/cm$^3$. The density of lightweight filler material is determined per ISO 12154:2014 test method. The density of the chopped roving thermoplastic composite sheets is determined according to ISO 1183 (2019). In a specific embodiment the lightweight filler material may be hollow glass microspheres, which are also commonly referred to as glass bubbles. In other embodiments, the lightweight filler material may be perlite or other lightweight materials.

In regards to hollow glass microspheres, these materials commonly have densities ranging from 0.10 to 0.60 g/cm$^3$ and are therefore, significantly lighter than both the rovings and thermoplastic resins of conventional chopped roving thermoplastic composite sheets. In some preferred embodiments, the hollow glass microspheres that are employed may have a density lower than 0.40 g/cm$^3$.

Since the lightweight filler material is significantly lighter in weight than both the rovings and thermoplastic resin, adding an appreciable amount of the lightweight filler material to the chopped roving thermoplastic composite sheet substantially reduces the overall density of the chopped roving thermoplastic composite sheet. The lightweight filler material reduces the overall density of the chopped roving thermoplastic composite sheet by occupying a volume or space within the composite sheet that would otherwise by filled or occupied by the heaver rovings and/or thermoplastic resin. In a specific embodiment, the weight percentage of hollow glass microspheres in the chopped roving thermoplastic composite sheet may be between 1% and 30%, preferably between 2% and 20%, and more preferably between 3% and 10%, based on the total weight of the composite sheet.

The use of the lightweight filler material results in chopped roving thermoplastic composite sheets that have a reduced density in comparison with conventional chopped roving thermoplastic composite sheet. The lightweight composite sheets exhibit high strength and impact resistance despite the reduced density.

In some embodiments, the lightweight filler material may be added to the thermoplastic resin described herein (e.g., powder thermoplastic resin, etc.), although the lightweight filler material is more commonly applied separately from the thermoplastic resin. In some embodiments, a filler application mechanism may be positioned above the lower belt so that the hollow glass microspheres are applied atop or within the chopped roving web or mesh. The filler application mechanism may be positioned immediately adjacent a fiber chopper or fiber scattering device so that the lightweight filler material is added relatively homogeneously to the chopped roving web or mesh. In other embodiments, the lightweight filler material may be combined with chopped rovings in a hopper. The lightweight filler material and chopped rovings may be scattered or dispersed via the fiber scattering device. The thermoplastic resin may then be applied to the chopped roving web or mesh that incorporates the hollow glass microspheres.

In some embodiments, the lightweight filler material may include a coating that facilitates bonding between the filler material and the thermoplastic resin. For example, a silane coating may be added to the surface of the hollow glass microspheres to increase the interfacial bonding strength between the microspheres and resin matrix. In addition to being lightweight, the glass microspheres exhibit excellent strength properties and thus, the use of the hollow glass microspheres in the lightweight composite sheets does not significantly negatively affect the strength properties of the composite sheets.

The lightweight filler material may be homogenously dispersed throughout the chopped roving web or mesh; may form a layer on top of the chopped roving web or mesh; or may be sandwiched between opposing layers of the chopped roving web or mesh. The penetration of the lightweight filler material into the chopped roving web or mesh may depend on how loosely the rovings are positioned in relation to one another. For example, hollow glass microspheres may be able to easily penetrate into the chopped roving web or mesh when the chopped rovings are positioned relatively loosely in relation to each other. In other embodiments, the lightweight filler material may form a layer atop the chopped roving web or mesh. For example, when the rovings are positioned relatively tightly together, the hollow glass microspheres may be filtered by the rovings and form a layer atop the chopped roving web or mesh. In such embodiments, a second layer of chopped roving web or mesh may be positioned atop the hollow glass microspheres so that the microspheres are sandwiched between opposing layers of the chopped roving web or mesh.

As briefly described herein, the lightweight composite sheet may have a lower density than conventional chopped roving thermoplastic composite sheets. For example, the lightweight composite sheet may have a density of between 1.0 and 1.7 g/cm$^3$. The lightweight composite sheet may comprise: a) 30 to 80% by weight of roving material; b) 20 to 70% by weight of thermoplastic resin; and c) 1 to 30% by weight of lightweight filler material. In preferred embodiments, the lightweight composite sheet may comprise: a) 40 to 70% by weight of roving material; b) 30 to 60% by weight of thermoplastic resin; and c) 2 to 15% by weight of lightweight filler material.

Figure 4:
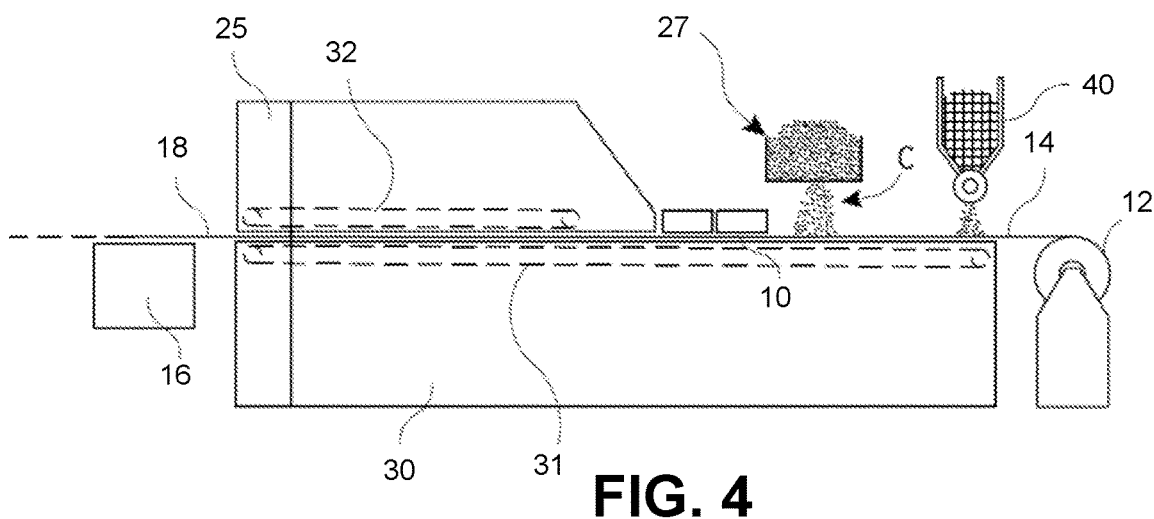
FIG. 4 illustrates a system that may be used to produce a lightweight chopped roving thermoplastic composite sheet.

FIG. 4 illustrates a system that includes a filler application mechanism 40 that is positioned atop the lower belt 31 and that is configured to apply a light weight filler material onto the lower belt 31, onto a chopped roving web or mesh, and/or onto a thermoplastic resin film 14. FIG. 4 illustrates that the system includes a fiber applicator 27, which may be a fiber chopper, fiber scattering device, or any combination of these two devices. The system also includes a resin applicator 10, oven 30, upper belt 32, cooling mechanism 25, and cutting mechanism 16 as previously described. In FIG. 4, the filler application mechanism 40 is illustrated as being positioned proximally of the fiber applicator 27, although it should be realized that the position of the fiber applicator 27 and filler application mechanism 40 may be switched so that the fiber applicator 27 is positioned proximally of the filler application mechanism 40. It should also be realized that the thermoplastic resin film 14 and roller 12 may be eliminated from the system as desired. The resin applicator 10 may also be replaced and other thermoplastic resin application means may be employed as described herein.

The lightweight filler material may be applied to the lower belt 31 and the chopped rovings C may be applied atop the lightweight filler material. In other embodiments, the chopped rovings C may be applied atop the lower belt 31 to form the chopped roving web or mesh and the lightweight filler material may be applied to the chopped roving web or mesh. The application of the lightweight filler material to the formed chopped roving web or mesh is a more common method of applying the lightweight filler material. In yet another embodiment, the lightweight filler material may be combined with the thermoplastic resin powders and may be applied onto the chopped roving web or mesh via the resin applicator 10. In yet another embodiment, the lightweight filler material may be combined with the chopped rovings and may be dispersed atop the lower belt 31 via a fiber scattering device.

In any embodiment, the lightweight filler material may penetrate into the chopped roving web or mesh so that the lightweight filler material is disposed at least partially within the chopped roving web or mesh. The degree of penetration of the lightweight filler material into the chopped roving web or mesh can be controlled by controlling the porosity of the chopped roving web or mesh, the size of the filler material, and the like. The lightweight filler material more commonly forms a layer that is positioned on one side of the chopped roving web or mesh, and more commonly atop the chopped roving web or mesh. A second fiber applicator (not shown) may be employed to apply second chopped rovings (not shown) atop the lightweight material and thereby form a second chopped roving web or mesh atop the lightweight filler material. In other embodiments, a nonwoven fiber mat or a woven fabric may be applied atop the lightweight filler material. If desired, additional lightweight filler materials may be provided via an additional filler application mechanism (not shown) to form a chopped roving thermoplastic composite sheet having a high filler material content.

The thermoplastic resin may be applied to the lightweight filler material and the chopped roving web or mesh via the resin applicator 10 or via any other thermoplastic resin application means described herein. The materials may then be subjected to the other processes of the system, such as the double belt compression mechanism, oven 30, cooling mechanism 25, cutting mechanism 16, and the like.

While the description herein generally refers to the use of an un-bonded chopped roving web or mesh, it should be appreciated that in some instances it may be desirable to couple the chopped rovings together via chemical means, mechanical means, or some other means. The thermoplastic resin may then be added to the coupled or adhered chopped roving web or mesh.

Exemplary Chopped Roving Thermoplastic Composite Sheets

The above system may be used to manufacture a chopped roving thermoplastic composite sheet as described above. The chopped roving thermoplastic composite sheet may include or consist of a chopped roving web or mesh in which the chopped rovings have an average roving length of between ¼ inch and 5 inches and an average fiber diameter of between 1 and 30 μm. The chopped roving thermoplastic composite sheet also includes a thermoplastic resin that impregnates the chopped roving web or mesh. The chopped roving thermoplastic composite sheet is composed or consists of a fully polymerized thermoplastic resin, which as stated above means that the chopped roving thermoplastic composite sheet does not include unpolymerized pre-polymer materials or resins (e.g., monomers or oligomers), B-stage materials, and the like. Rather, the thermoplastic resin is completely polymerized within the chopped roving thermoplastic composite sheet.

The chopped roving thermoplastic composite sheet includes between 20 to 80 weight percent of the thermoplastic resin, the chopped roving web or mesh is not mechanically bonded, and the chopped roving web or mesh does not include a binder that bonds or adheres the chopped rovings together. Rather, the thermoplastic resin matrix is essentially the only material that couples the chopped rovings together within the chopped roving thermoplastic composite sheet. Since the thermoplastic resin matrix functions as the binding agent for the chopped rovings, when the thermoplastic resin is heated to above its melting temperature, the thermoplastic resin and the chopped rovings are able to move, flow, and conform to a mold or cavity. Stated differently, when the chopped roving thermoplastic composite sheet is subjected to a heating and/or pressure process, the thermoplastic resin softens or melts, which allows the chopped roving thermoplastic composite sheet to be molded or formed into a composite part.

Figure 5:
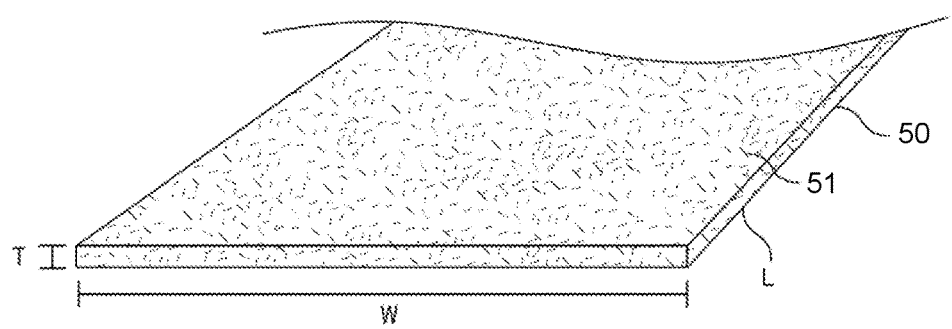
FIG. 5 illustrates a chopped roving thermoplastic composite sheet.

Referring to FIG. 5, illustrated is a chopped roving thermoplastic composite sheet that may be formed by one of the systems and/or methods described herein. The chopped roving thermoplastic composite sheet includes a chopped roving web or mesh 50 that includes a plurality of chopped rovings 51 having a roving length and a fiber diameter as described herein. The chopped roving web or mesh includes un-bonded chopped rovings that are not mechanically or chemically bonded or coupled. Rather, the chopped roving web or mesh 50 is bonded together via the thermoplastic resin matrix within the chopped roving thermoplastic composite sheet. The chopped roving web or mesh 50 may include multiple roving types and/or roving sizes as described herein that are homogenously or uniformly dispersed within the chopped roving web or mesh 50. The chopped rovings 51 may include a sizing composition that has a coupling agent that promotes bonding between the chopped rovings 51 and the thermoplastic resin. The chopped rovings may include or consist of glass fibers, carbon fibers, basalt fibers, metal fibers, ceramic fibers, cellulosic fibers, natural fibers, aramid fibers, inorganic fibers, polymer fibers, or combinations thereof. In some instances, it may be beneficial to use a chemically or mechanically coupled chopped roving web or mesh 50 and thus, the chopped roving web or mesh 50 is not limited to a specific configuration (i.e., bonded or un-bonded) unless specifically recited in the claims.

The thermoplastic resin impregnates the chopped roving web or mesh 50. The thermoplastic resin may include or consist of polyolefins, polypropylene (PP), high-density polyethylene (HDPE), polyamides (including PA6 and PA6, 6), polyethylene terephthalate (PET), polybutylene terephthalate (PBT), polycarbonate (PC), polyphthalamide (PPA), acrylonitrile-butadiene-styrene (ABS), PC/ABS, thermoplastic polyurethane (TPU), polyphenylene sulfide (PPS), acetal (polyoxymethylene or POM) resins, polyethyleneimine (PEI), polyether ether ketone (PEEK), polyacrylonitrile, copolyacrylonitriles including poly(styrene-co-acrylonitrile) (SAN), or any combination thereof. The chopped roving thermoplastic composite sheets may have essentially any length L, width W, and/or thickness T. The chopped roving thermoplastic composite sheets commonly have a thickness of between 0.2 mm and 10 mm, and more commonly have a thickness of between 0.5 mm and 3 mm. Thickness measurement are commonly visually determined using known thickness measurement equipment, such as caliper or thickness gauge.

Figure 6:
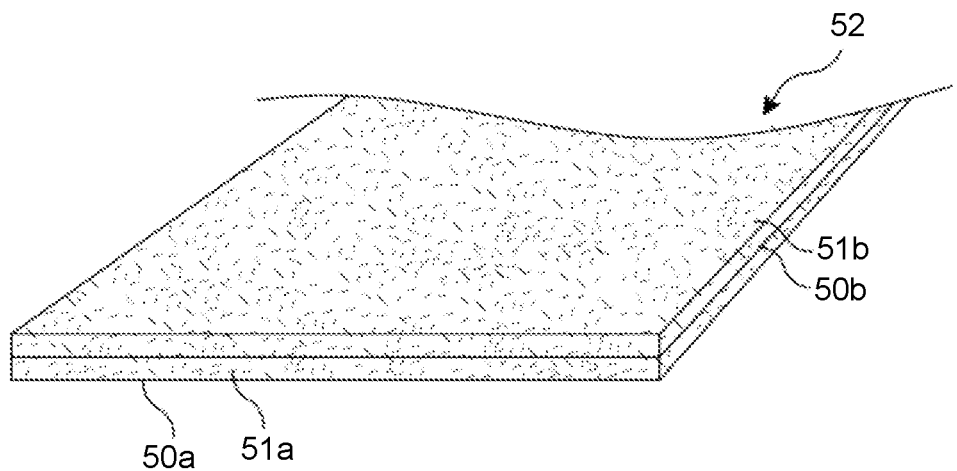
FIG. 6 illustrates another chopped roving thermoplastic composite sheet.

FIG. 6 illustrates another chopped roving thermoplastic composite sheet 52 in which the chopped roving web or mesh includes a first layer 50a of first chopped rovings 51a and a second layer 50b of second chopped rovings 51b. The first chopped rovings 51a and second chopped rovings 51b are typically different roving types and/or roving sizes. The composition of each roving layer, the density of each roving layer, and/or the thickness of each roving layer may be selected based on a given application of the chopped roving thermoplastic composite sheet and/or based on a desired composite property. The first chopped rovings 51a and second chopped rovings 51b are typically not entangled or intermixed except for at an interface between the first layer 50a and the second layer 50b. In some embodiments, the thermoplastic resin impregnates the first layer 50a and the second layer 50b.

In other embodiments, the second layer 50b may represent a layer of polymer fibers that are configured to melt within an oven as described herein. The first layer 50a may represent reinforcing roving, which may include glass fibers, carbon fibers, and the like, and which do not melt or soften in the oven. The polymer fibers of the second layer 50b may soften or melt and flow within the reinforcing rovings of the first layer 50a. In such embodiments, the polymer fibers may function as the primary thermoplastic resin for the chopped roving thermoplastic composite sheet, or may function as a secondary thermoplastic resin in which the polymer fibers are used along with a powder thermoplastic resin, melt resin, and/or thermoplastic resin film. The second layer 50b may also represent the thermoplastic resin film, or the melt resin, that is positioned on one side of the chopped roving web or mesh (i.e., first layer 50a) as described herein. The chopped roving thermoplastic composite sheet of FIG. 6 may include any of the chopped rovings or thermoplastic resins described herein and may have a thickness as described herein. The chopped roving web or mesh may also include additional layers of chopped rovings as desired.

Figure 7:
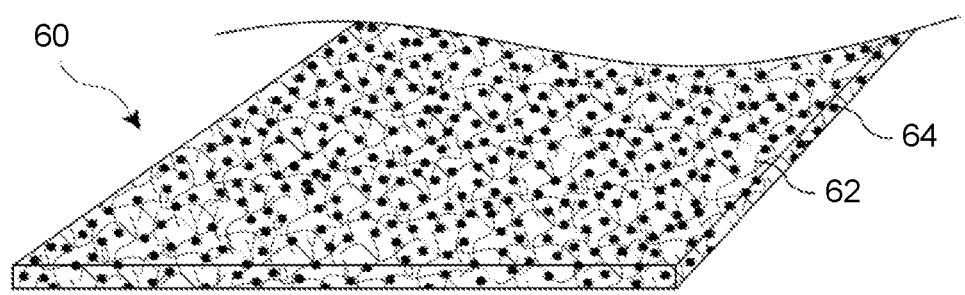
FIG. 7 illustrates a lightweight chopped roving thermoplastic composite sheet.

FIG. 7 illustrates a lightweight chopped roving thermoplastic composite sheet 60 (hereinafter lightweight composite sheet 60). The lightweight composite sheet 60 includes a chopped roving web or mesh that includes a plurality of rovings 62 having a roving length and a fiber diameter as described herein. The chopped roving web or mesh includes un-bonded chopped rovings 62 that are not mechanically or chemically bonded or coupled. Rather, the chopped roving web or mesh is bonded together via the thermoplastic resin matrix within the lightweight chopped roving thermoplastic composite sheet. The chopped roving web or mesh may include multiple roving types and/or roving sizes as described herein that are homogenously or uniformly dispersed within the chopped roving web or mesh. The lightweight composite sheet 60 also includes a light weight filler material, which in an exemplary embodiment comprises or consists of hollow glass microspheres 64. It should be realized that in other embodiments, the lightweight filler material may comprise or consist of perlite or some other lightweight material. The hollow glass microspheres 64 are homogenously dispersed within the chopped roving web or mesh. The chopped rovings 62 and/or hollow glass microspheres 64 may include a sizing composition that has a coupling agent that promotes bonding between the respective materials and the thermoplastic resin. In some instances, it may be beneficial to use a chemically or mechanically coupled chopped roving web or mesh and thus, the chopped roving web or mesh is not limited to a specific configuration (i.e., bonded or un-bonded) unless specifically recited in the claims.

A thermoplastic resin impregnates the chopped rovings 62 and hollow glass microspheres 64. The thermoplastic resin may comprise or consist of any of the thermoplastic resin materials described herein. The lightweight composite sheet 60 may have a thickness as described herein. The lightweight composite sheet 60 may also include additional layers (not shown) of chopped rovings that may or may not include hollow glass microshperes as desired.

Figure 8:
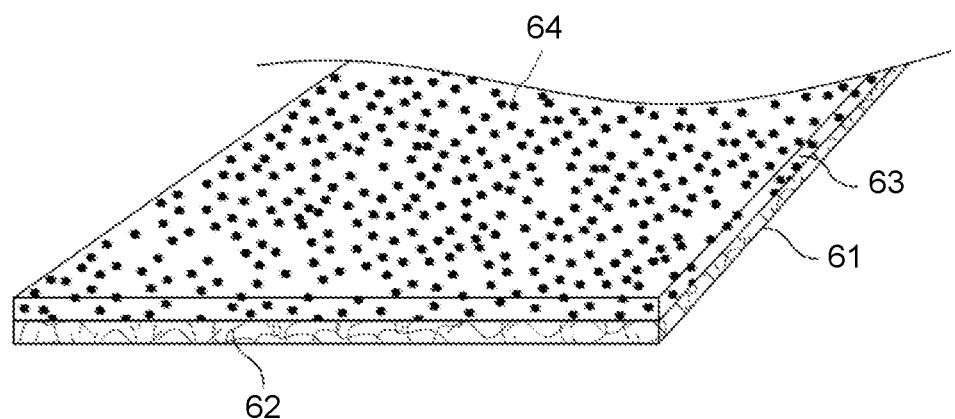
FIG. 8 illustrates another lightweight chopped roving thermoplastic composite sheet.

FIG. 8 illustrates a lightweight composite sheet having a layered configuration. Specifically, the lightweight composite sheet includes a first layer 61 that includes a chopped roving web or mesh having a plurality of chopped rovings 62 as described herein. A second layer 63 is positioned atop the first layer 61. The second layer 63 is a layer of the hollow glass microspheres 64. The second layer 63 typically only includes the hollow glass microspheres 64, although in some embodiments the second layer 63 may include a combination of the hollow glass microspheres 64 and the chopped rovings 62. In some embodiments, a third layer (not shown) may be positioned atop the second layer 63. The third layer may be a chopped roving web or mesh similar to the first layer 61. In such embodiments, the hollow glass microspheres are sandwiched between opposing chopped roving web or mesh layers. The lightweight composite sheet of FIG. 8 may include any of the chopped rovings, lightweight filler materials, or thermoplastic resins described herein and may have a thickness as described herein.

The lightweight composite sheets of FIGS. 7 and 8 may have a density of between 1.0 and 1.7 g/cm$^3$. The lightweight composite sheets may comprise: a) 30 to 80% by weight of roving material; b) 20 to 70% by weight of thermoplastic resin; and c) 1 to 30% by weight of lightweight filler material. In preferred embodiments, the lightweight composite sheet may comprise: a) 40 to 70% by weight of roving material; b) 30 to 60% by weight of thermoplastic resin; and c) 2 to 15% by weight of lightweight filler material.

In some embodiments, the chopped roving thermoplastic composite sheets of FIGS. 5-8 may have an area weight between 100 and 5000 g/m$^2$ and/or may be a rolled product. The area weight of the chopped roving thermoplastic composite sheet may be determined by dividing the weight of the composite sheet by the area of the composite sheet. In other embodiments, the chopped roving thermoplastic composite sheets may be cut to desired length and width. The chopped roving thermoplastic composite sheets may be subsequently formed into a composite part. For example, one or more layers of the chopped roving thermoplastic composite sheets may be compression molded into a desired composite part. Exemplary techniques for forming the chopped roving thermoplastic composite sheets into a fiber-reinforced composite article may include compression molding of a single composite sheet, or multiple composite sheets, into the fiber-reinforced article. Pre-heating is typically used to melt the thermoplastic resin, prior to the compression molding of the chopped roving thermoplastic composite sheet to form the shape of the final article.

The chopped roving thermoplastic composite sheets may also be used to in conjunction with other fibers and resin materials to make the final composite article. For example, the chopped roving thermoplastic composite sheet may be placed in selected sections of a tool or mold to reinforce the article and/or provide material in places that are difficult to reach for thermoset and/or thermoplastic resins. For example, the chopped roving thermoplastic composite sheets may be applied to sharp corners and other highly structured areas of a mold or layup used in reactive injection molding processes (RIM), structural reactive injective molding processes (SRIM), resin transfer molding processes (RTM), vacuum-assisted resin transfer molding processes (VARTM), spray-up forming processes, filament winding processes, and long-fiber injection molding processes, among others. The chopped roving thermoplastic composite sheet may also be used as local reinforcement or for overmolding during injection and compression molding processes including LFT (long fiber thermoplastic) and D-LFT (direct-long fiber thermoplastic).

Exemplary composite products that may be formed from the chopped roving thermoplastic composite sheets include: automotive components, wind turbine blade components, building and construction components, electrical components, sports and leisure components, and/or other components. Exemplary automotive components include: cockpit, seats, instrument panels, side beams, bottom plate, bottom plate side beam, door trims, body panels, openings, underbody, front/rear modules, engine compartment, engine covers, battery trays, oil pans, bonnets/hoods, fenders, spoilers, and the like.

Exemplary wind turbine blade components include: spar cap, shells, root inserts, and the like. Exemplary building and construction components include: columns, pediments, domes, panels, window profiles, ladder rails, and the like. Exemplary electrical components include: light poles, circuit boards, electrical junction boxes, and the like. Exemplary sports and leisure components include: golf club shafts, golf trolleys, and the like. Other components that may be formed form the chopped roving thermoplastic composite sheets include: components for mass transportation, agricultural equipment, and trailers/RV including passenger seats, standbacks, wall claddings, floor panels, large panels for trailer walls, truck and tractor cabs, bus body shells, cargo containers, and the like.

In one embodiment, the chopped roving thermoplastic composite sheets may comprise 30 to 80% by weight of fibrous material and 20 to 70% by weight of thermoplastic resin based on the total weight of the composite. In another embodiment, the chopped roving thermoplastic composite may comprise 40 to 70% by weight of fibrous material and 30 to 60% by weight of thermoplastic resin based on the total weight of the composite.

Methods

Figure 9:
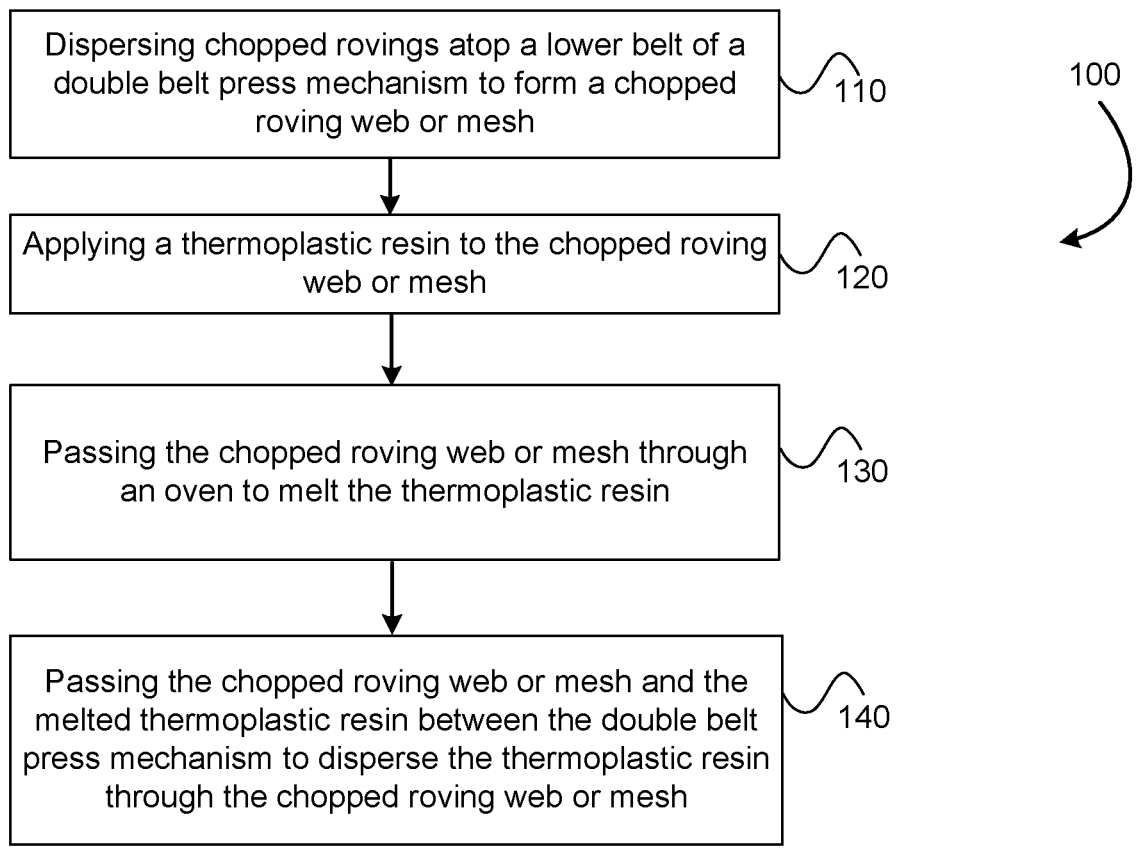
FIG. 9 illustrates a method of forming a chopped roving thermoplastic composite sheet.

FIG. 9 illustrates a method 100 of forming a chopped roving thermoplastic composite sheet. At block 110, chopped rovings are dispersed via a fiber applicator that is atop a lower belt of a double belt press mechanism. The dispersed chopped rovings form a chopped roving web or mesh atop the lower belt. At block 120, a thermoplastic resin is applied to the chopped roving web or mesh. At block 130, the resinated chopped roving web or mesh is passed through an oven that is configured to melt the thermoplastic resin as the chopped roving web or mesh is moved through the oven. At block 140, the chopped roving web or mesh and the melted thermoplastic resin is passed between the lower belt and an upper belt of the double belt press mechanism to press the melted thermoplastic resin and the chopped rovings and thereby disperse the melted thermoplastic resin through the chopped roving web or mesh and fully saturate the chopped roving web or mesh with the melted thermoplastic resin. In most embodiments, the steps at block 130 and block 140 occur simultaneously or nearly simultaneously. For example, the chopped roving web or mesh may be passed between the lower belt and the upper belt as the chopped roving web or mesh enters the oven, before the chopped roving web or mesh enters the oven, or shortly after the chopped roving web or mesh enters the oven. In other embodiments, the steps at blocks 130 and 140 may occur simultaneously.

As previously described, the method does not include entangling the chopped rovings via a fiber entangling device and does not include applying a binder to the chopped rovings. As such, the chopped roving web or mesh is not mechanically bonded and does not include a binder. The chopped roving thermoplastic composite sheet is also substantially free of unpolymerized polymer materials as described herein. In some embodiments, the method also includes passing the chopped roving web or mesh through a cooling mechanism after the chopped roving web or mesh and the melted thermoplastic resin are pressed by the double belt press mechanism.

In some embodiments, dispersing the chopped rovings includes or consists of cutting the rovings via a fiber chopper that is positioned above the lower belt. In such embodiments, the fiber chopper is positioned so that as the rovings are cut, the chopped rovings fall atop the lower belt and form the chopped roving web or mesh. As described herein, after being cut by the fiber chopper, the rovings are not subjected to additional processes that would open up the rovings. Rather, the rovings remain in essentially the same state after being cut by the fiber chopper.

Cutting the rovings via the fiber chopper may include cutting reinforcing rovings and cutting polymer fibers via the fiber chopper. In such embodiments, the polymer fibers may be configured to melt within the oven and the step of applying thermoplastic resin to the chopped roving web or mesh may be performed by cutting the polymer fibers via the fiber chopper. As such, a separate resin applicator is not needed, but may be used to provide a powder thermoplastic resin to the chopped roving web or mesh or to provide a thermoplastic resin melt or thermoplastic film. When the fiber chopper is used to cut both the polymer fibers and the reinforcing rovings, the fiber chopper cuts both the polymer fibers and the reinforcing rovings so that the polymer fibers and the reinforcing rovings fall atop the lower belt and form the chopped roving web or mesh. The method may further include heating the chopped roving web or mesh via a heating mechanism as the chopped roving web or mesh is moved across the lower belt.

In some embodiments, the fiber chopper is a first fiber chopper and the chopped rovings are first chopped rovings. In such embodiments, the method may also include cutting second rovings via a second fiber chopper that is positioned above the lower belt to form second chopped rovings. The second fiber chopper may be positioned so that as the second rovings are cut, the second chopped rovings fall atop the first chopped rovings and form a layered or hybrid chopped roving web or mesh. The second rovings may include or consist of polymer fibers that are configured to melt within the oven. The polymer fibers may be dispersed within the first chopped rovings upon melting to fully saturate the first chopped rovings with a thermoplastic resin.

A sizing composition may be applied to the rovings. The sizing composition may have a coupling agent that promotes bonding between the chopped rovings and the thermoplastic resin. In some embodiments, the method may include unwinding a fabric or nonwoven mat from a roller and moving the fabric or nonwoven mat atop the lower belt so that the chopped rovings are positioned above or below the fabric or nonwoven mat and form a layered or hybrid chopped roving web or mesh that includes or consists of the chopped rovings and the fabric or nonwoven mat. The layered or hybrid chopped roving web or mesh may then be subjected to the resin applicator, the double belt mechanism, and the oven to ensure that thermoplastic resin fully saturates the layered or hybrid chopped roving web or mesh and impregnates the layered or hybrid chopped roving web or mesh.

In some embodiments, the chopped rovings are dispersed via a fiber scattering device as an alternative to, or in addition to, the fiber chopper. The fiber scattering device may be positioned above the lower belt and may be configured to scatter pre-cut chopped rovings atop the lower belt to form the chopped roving web or mesh. In such embodiments, the fiber scattering device may be configured to scatter multiple roving types or roving sizes including: 1) polymer fibers that are configured to melt within the oven and 2) reinforcing rovings. The fiber scattering device may disperse the polymer fibers and the reinforcing rovings atop the lower belt to form the chopped roving web or mesh. In such instances, the fiber scattering device may function as both the fiber applicator and resin applicator so that a separate resin applicator (e.g., powder resin applicator) is not needed. In such embodiments, the polymer fibers function as the thermoplastic resin that is applied to the chopped roving web or mesh. Alternatively, a separate resin applicator may be used in addition to the polymer fibers that are scattered via the fiber scattering device.

In some embodiments, applying the thermoplastic resin to the chopped roving web or mesh includes dispersing a powder thermoplastic resin onto the chopped roving web or mesh via a powder application device. The powder thermoplastic resin is dispersed onto the chopped roving web or mesh as the chopped roving web or mesh is moved past the powder application device. The thermoplastic resin particles fall into interstices between the chopped rovings of the chopped roving web or mesh. In another embodiment, applying the thermoplastic resin to the chopped roving web or mesh includes unrolling a thermoplastic film from a roller so that thermoplastic film forms a bottom layer of the chopped roving web or mesh, a top layer of the chopped roving web or mesh, or both a bottom layer and a top layer of the chopped roving web or mesh. In yet another embodiment, applying the thermoplastic resin to the chopped roving web or mesh includes extruding a molten thermoplastic resin sheet atop the chopped roving web or mesh or dispersing thermoplastic fibers atop the chopped roving web or mesh via a fiber chopper or a fiber scattering device. In some embodiments, one or more of the above thermoplastic resin application processes may be employed in the method, or each of the application processes may be employed in the method. The method may further include cutting the chopped roving thermoplastic composite into sheets.

In some embodiments, the method additionally includes applying a lightweight filler material to the chopped roving web or mesh so that the lightweight filler material is dispersed within the chopped roving web or mesh or forms a layer on a first side of the chopped roving web or mesh. The lightweight filler material may be applied to the chopped roving web or mesh via a filler application mechanism that is positioned atop the lower belt. The filler application mechanism may apply the lightweight filler material atop the lower belt and/or atop the chopped roving web or mesh as the lower belt and/or chopped roving web or mesh are moved past the filler application mechanism. In a specific embodiment, the lightweight filler material may comprise or consist of hollow glass microspheres.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the glass fiber" includes reference to one or more glass fibers and equivalents thereof known to those skilled in the art, and so forth. The invention has now been described in detail for the purposes of clarity and understanding. However, it will be appreciated that certain changes and modifications may be practice within the scope of the appended claims.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of forming a chopped roving thermoplastic composite sheet comprising:
    dispersing, via a fiber applicator, chopped rovings directly onto a lower belt of a double belt press mechanism to form a chopped roving web or mesh atop the lower belt;
    applying a thermoplastic resin to the chopped roving web or mesh;
    passing the chopped roving web or mesh through an oven that is configured to melt the thermoplastic resin as the chopped roving web or mesh is moved through the oven; and
    passing the chopped roving web or mesh and the melted thermoplastic resin between the lower belt and an upper belt of the double belt press mechanism to press the melted thermoplastic resin and the chopped rovings and thereby disperse the melted thermoplastic resin through the chopped roving web or mesh and fully saturate the chopped roving web or mesh with the melted thermoplastic resin; wherein:
        the method does not include entangling the chopped rovings via a fiber entangling device and does not include applying a binder to the chopped rovings such that the chopped roving web or mesh is not mechanically bonded and does not include a binder other than the thermoplastic resin; and
        the chopped roving thermoplastic composite sheet is substantially free of unpolymerized resin materials.

2. The method of claim 1, further comprising passing the chopped roving web or mesh through a cooling mechanism after the chopped roving web or mesh and the melted thermoplastic resin are pressed by the double belt press mechanism.

3. The method of claim 1, wherein the thermoplastic resin is applied simultaneously with the dispersion of the chopped rovings atop the lower belt.

4. The method of claim 1, wherein dispersing the chopped rovings comprises cutting rovings via a fiber chopper that is positioned above the lower belt, the fiber chopper being positioned so that as the rovings are cut, the chopped rovings fall atop the lower belt and form the chopped roving web or mesh.

5. The method of claim 4, wherein:
    dispersing the chopped rovings atop the lower belt includes cutting reinforcing rovings via the fiber chopper;
    applying the thermoplastic resin to the chopped roving web or mesh includes cutting polymer fibers, via the fiber chopper, the polymer fibers being configured to melt within the oven; and
    the fiber chopper cuts both the polymer fibers and the reinforcing rovings so that the polymer fibers and the reinforcing rovings fall atop the lower belt and form the chopped roving web or mesh.

6. The method of claim 4, wherein the fiber chopper is a first fiber chopper and the chopped rovings are first chopped rovings, and wherein the method further comprises cutting second rovings via a second fiber chopper that is positioned above the lower belt to form second chopped rovings, the second fiber chopper being positioned so that as the second rovings are cut, the second chopped rovings fall atop the first chopped rovings and form a layered or hybrid chopped roving web or mesh.

7. The method of claim 6, wherein the second rovings include polymer fibers that are configured to melt within the oven and fully saturate the first chopped rovings.

8. The method of claim 4, further comprising heating the chopped roving web or mesh via a heating mechanism prior to passing the chopped roving web or mesh through the oven.

9. The method of claim 1, wherein the chopped rovings are dispersed via a fiber scattering device that is positioned above the lower belt, the fiber scattering device being configured to scatter pre-cut chopped rovings atop the lower belt to form the chopped roving web or mesh.

10. The method of claim 9, wherein:
    the fiber scattering device is configured to scatter chopped rovings of multiple roving types or roving sizes including: 1) polymer fibers that are configured to melt within the oven and 2) reinforcing rovings;
    the fiber scattering device disperses the polymer fibers and the reinforcing rovings atop the lower belt to form the chopped roving web or mesh; and
    the fiber scattering device functions as both the fiber applicator and a resin applicator in which the polymer fibers are the thermoplastic resin that is applied to the chopped roving web or mesh.

11. The method of claim 1, wherein applying the thermoplastic resin to the chopped roving web or mesh comprises dispersing, via a powder application device, powder thermoplastic resin onto the chopped roving web or mesh as the chopped roving web or mesh is moved past the powder application device such that the powder thermoplastic resin falls into interstices between the chopped rovings of the chopped roving web or mesh.

12. The method of claim 1, wherein applying the thermoplastic resin to the chopped roving web or mesh comprises unrolling a thermoplastic resin film from a roller so that the thermoplastic resin film is positioned under the chopped roving web or mesh, is positioned atop the chopped roving web or mesh, or is positioned both under and atop the chopped roving web or mesh.

13. The method of claim 1, wherein applying the thermoplastic resin to the chopped roving web or mesh comprises extruding a molten thermoplastic resin sheet atop the chopped roving web or mesh.

14. The method of claim 1, wherein applying the thermoplastic resin to the chopped roving web or mesh comprises dispersing thermoplastic fibers atop or within the chopped roving web or mesh via a fiber chopper or a fiber scattering device.

15. The method of claim 1, further comprising applying a sizing composition to the chopped rovings, the sizing composition having a coupling agent that promotes bonding between the chopped rovings and the thermoplastic resin.

16. The method of claim 1, wherein the chopped rovings include glass fibers, carbon fibers, basalt fibers, metal fibers, ceramic fiber, cellulosic fibers, natural fibers, aramid fibers, inorganic fibers, polymer fibers, or combinations thereof.

17. The method of claim 1, further comprising cutting the chopped roving thermoplastic composite sheet to a desired length and width.

18. The method of claim 1, wherein the thermoplastic resin comprises polyolefins, polypropylene (PP), high-density polyethylene (HDPE), polyamides, polyethylene terephthalate (PET), polybutylene terephthalate (PBT), polycarbonate (PC), polyphthalamide (PPA), acrylonitrile-butadiene-styrene (ABS), PC/ABS, thermoplastic polyurethane (TPU), polyphenylene sulfide (PPS), acetal (polyoxymethylene or POM), polyethyleneimine (PEI), polyether ether ketone (PEEK), polyacrylonitrile, copoly-acrylonitriles including poly(styrene-co-acrylonitrile) (SAN), or combinations thereof.

19. The method of claim 1, wherein the upper belt of the double belt press mechanism is fully enclosed within the oven.

20. The method of claim 1, further comprising applying a filler material to the chopped roving web or mesh so that the filler material is dispersed within the chopped roving web or mesh or forms a layer on a first side of the chopped roving web or mesh.

21. The method of claim 20, wherein the filler material is a lightweight filler material.

22. The method of claim 21, wherein the lightweight filler material comprises hollow glass microspheres.

23. The method of claim 1, wherein the thermoplastic resin is applied to the chopped roving web or mesh so that the thermoplastic resin is only positioned atop the chopped roving web or mesh.

* * * * *